June 15, 1965 L. HOCHGRAF 3,189,688

TRANSMISSION IMPROVEMENT IN PARTY-LINE TELEPHONE SYSTEMS

Filed Sept. 27, 1961

$I_4 = I_0 - I_1$

INVENTOR
L. HOCHGRAF
BY
J. V. De Simone
ATTORNEY

United States Patent Office 3,189,688
Patented June 15, 1965

3,189,688

TRANSMISSION IMPROVEMENT IN PARTY-LINE TELEPHONE SYSTEMS

Lester Hochgraf, Madison, N.J., assignor to Bell Telephone Laboratories, Incorporated, New York, N.Y., a corporation of New York Filed Sept. 27, 1961, Ser. No. 141,199
3 Claims. (Cl. 179—35)

This invention concerns telephone systems. In particular, it concerns party-line telephone systems in which two or more telephone substations are bridged across a common line and in which transmitter power is derived from a common battery.

It is an object of the invention to improve the overall quality of transmission in party-line telephone systems and to do so simply and economically.

The economic advantages of party-line systems are often considerably offset by technical disadvantages. One disadvantage, which has been with us virtually since the beginning of the telephone era, has been the problem of improving the transmission of voice signals from the remotely located subscribers of party-line systems. To understand this problem we ought to consider first the nature of a typical telephone instrument.

In a modern telephone transmitter, granules of carbon are held between two electrodes—one a cup holding the granules and the other a diaphragm. The contact resistance between the granules is changed by sound pressure on the diaphragm. The resulting resistance variation modulates a battery current flowing between the electrodes. An acoustic message is thus transformed into an electrical signal, the level of which is dependent both on the value of direct current flowing between the transmitter electrodes and the varying resistance between them.

In the receiver, the varying component of this signal passes through a winding on a permanent magnet. The variation in the strength of the magnetic field causes vibration of the diaphragm, which in turn generates sound waves corresponding to those of the original acoustic message.

Now when two or more subscribers in a party-line telephone system are off-hook simultaneously, the distribution of current to their transmitters will depend upon the resistance between the common battery and their respective transmitters. Consequently, at the expense of the remote subscriber, the telephone set which is nearer to the central office receives a disproportionate share of the common battery current. In typical cases, this disproportion can reach ratios of more than 3 to 1—that is, the nearer subscriber may receive three times as much common battery current as does the distant subscriber. This means comparatively poor transmission from the more distant subscriber. Moreover, if the party line system is equipped with automatic bridge lifting devices that operate on a level differentiating principle (for example, saturable core inductor bridge lifters), the bridge lifters in the branches more distant from the central office may be only partially switched in view of the low current that reaches them.

In a party-line arrangement, therefore, the remote subscriber in effect becomes the neglected step-child of the system. To improve his lot, many schemes have been tried in the past. Since the transmission of telephone voice messages is one of the oldest and most basic problems in the field of electrical communications, we can go as far back as Patent No. 234,578, which issued to G. d'Infreville on November 16, 1880. d'Infreville proposed the use of resistance build-out in party-line systems. That is to say, he proposed the equalization of the resistance of all paths connecting a common battery to the various subscriber stations by inserting ohmic resistances in appropriate paths. The trouble with d'Infreville's proposal is that bulky by-pass capacitors are necessary to insure the successful transmission of voice messages around the inserted ohmic resistances. Accordingly, this method has been avoided. Another method employed in the past has been the use of local battery sets, either to supply transmitter power exclusively to their associated transmitters or to assist a common battery in this supply. This method was employed as recently as five or six years ago, but it, too was ultimately abandoned because of the undesirability and impracticality of the frequent battery replacement procedures.

The illustrative prior art methods, mentioned above, have either failed in the first instance to secure adherents or been abandoned as impractical, undesirable, or uneconomical—with the result that the remote subscriber still remains a neglected and oftentimes indignant member of the party-line family. It was to give him equal status with his fellow subscribers that the present invention was conceived.

The invention accomplishes this as follows. Local sources of potential are inserted in the "close-in" subscriber loops of a party-line telephone system, but are inserted so that they will oppose the flow of common battery current from the central office. The voltages of these sources of potential are such that, in combination with the common battery voltage and the differences in the resistances between the common battery and the various telephone sets, the current to off-hook telephone sets is always substantially shared. Thus, when a remote subscriber and a "close-in" subscriber are simultaneously off-hook (e.g. in a revertive call), they equally share the common battery current.

It is a feature of the invention that each of these local sources of potential, because it is inserted in its respective loop to oppose the flow of current from the central office common battery, is charged whenever common battery current flows through the loop. Because they are so charged, the frequency of battery replacement is very considerably reduced. It should again be noted that the necessity for relatively frequent battery replacement was a major factor in the ultimate abandonment of local batteries for transmitter power.

It is a principal advantage of the invention that the "bucking" sources of potential offer virtually no impedance to alternating voice currents and, consequently, bulky by-pass capacitors are not required. It will be recalled that bulky by-pass capacitors made the method proposed by d'Infreville an impractical one.

The various objects and features of this invention will become more apparent after a consideration of the following discussion and the drawing to which it relates. In the drawing.

Figure 1:
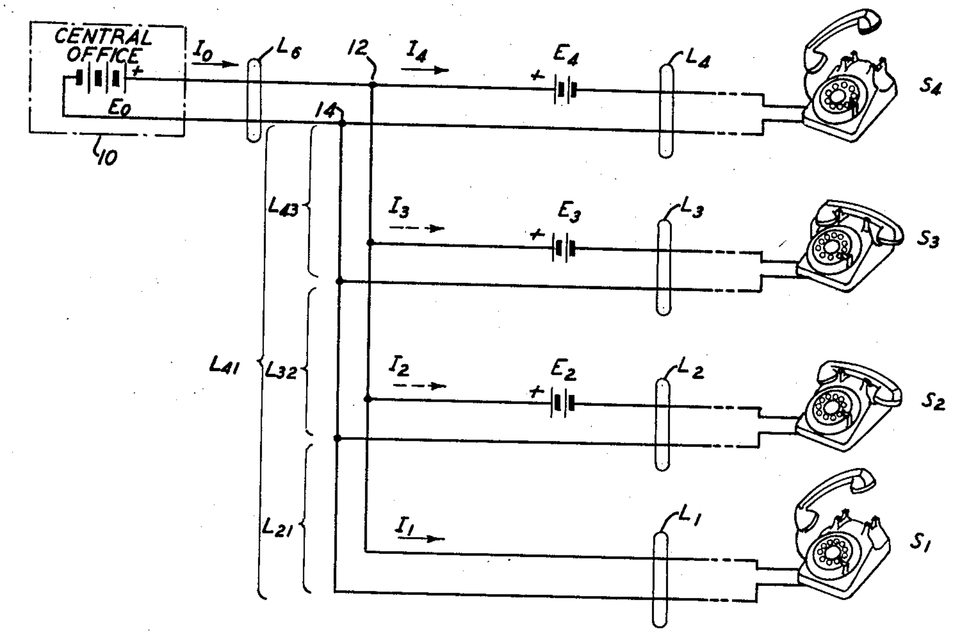
FIG. 1 is a very simplified diagram of a telephone party-line system arranged in accordance with the invention.

In FIG. 1, four subscriber loops L1, L2, L3 and L4, the terminations of which are located at some distances from each oher and from their associated central office 10, are connected at the central office to the common terminals 12 and 14 by way of a common line $L_{41}$. For the sake of simplicity, only four subscriber loops are shown. Likewise, the well-known particulars of the central office 10 and of the substations S1, S2, S3 and S4 have been omitted. For the circuit details of a typical central office and substation, reference may be respectively made to Patent No. 2,585,904, which issued February 19, 1952, to A. J. Busch, and to Patent No. 2,629,783, which issued on February 24, 1953, to H. Hopkins.

Various combinations of calls are possible in the system shown. For example, the subscriber S4 may wish to call the subscriber S1. Since they are both bridged across the same common line, $L_{41}$, the call is what is known as a "revertive" call. Another type of call that may be effected in the system of FIG. 1 is one where, for example, the substation S1 would be calling, through the central office 10, a party in another telephone exchange (not shown). This call is commonly known as an "outside" call.

For the purposes of the discussion that follows, the substations S4 and S1 are shown off-hook and, therefore, in a revertive talking relationship. The substations S2 and S3 are shown on-hook. Consequently, the current $I_0$ from the common battery $E_0$ flows only into the subscriber loops L1 and L4.

It can be seen that the telephone set S1 is the one most remote from the central office 10, for the current $I_0$ must traverse the entire length of the common line $L_{41}$ in order to reach the telephone set S1. Accordingly, absent the practice of the invention, the current $I_1$ would be considerably less than the current $I_4$. We assume here that the subscriber loops L1, L2, L3 and L4 are all roughly of the same length. They would in practice, however, be of varying length and, indeed, the loop L1 could be the longest loop in the system, which would aggravate the unequal distribution of current from the common battery $E_0$.

In accordance with the invention, the bucking-voltage sources $E_2$, $E_3$ and $E_4$ are serially inserted in the subscriber loops L2, L3 and L4, respectively. The values of these voltages are chosen so as to effect a substantially equal distribution of the common battery current $I_0$ whenever two or more telephone sets are off-hook.

Various types of voltage sources may be employed to "buck" the common battery $E_0$. For example, storage cells or counter-E.M.F. (electromotive force) cells could be used. The storage cells could be of the miniaturized cadmium type. In the practice of the invention, such cadmium cells could be capable of trouble-free service periods of as long as five years.

We will now consider the manner in which the values of these bucking voltages are determined. Since any pair of subscribers can be off-hook at any time, one way to solve this problem is to determine the bucking voltage required to effect current sharing for each possible pair of off-hook subscribers.

To illustrate, let us continue with our assumption that the telephone set S1 is farthest removed from the central office 10 and the loops L1, L2, L3 and L4 are all roughly of the same length. Now suppose, for the time being, that we let $R1$=the total resistance from the central office 10 to the set S1;
$R2$=the total resistance from the central office 10 to the set S2;
$R3$=the total resistance from the central office 10 to the set S3; and
$R4$=the total resistance from the central office 10 to the set S4.

In accordance with our assumption, $$R1>R2>R3>R4$$

and, therefore, the bucking voltages $E_2$, $E_3$ and $E_4$ should be chosen so that $$E_4>E_3>E_2$$

The precise values of these bucking voltages will depend on the system parameters: the potential of the common battery $E_0$; the values of (1) the resistance encountered in the central office 10, (2) the resistance of the loop L6, which extends from the central office 10 to the terminals 12 and 14, (3) the resistances of the connecting lines $L_{43}$, $L_{32}$ and $L_{21}$, (4) the resistances of the loops L1, L2, L3 and L4, and (5) the resistance (presumably constant) of each of the telephone sets S1, S2, S3 and S4.

In FIG. 1, for example, we could compute the required value of $E_2$ with the sets S1 and S2 simultaneously off-hook. Inserting $E_2$ in the loop L2, we could then compute the required voltage of $E_3$—first with the sets S3 and S1 simultaneously off-hook and then with the sets S3 and S2 simultaneously off-hook. These computations would ordinarily be slightly different, so we would compromise them. Finally, after inserting $E_3$ in the loop L3, we would compute the required voltage of $E_4$ by successively computing the cases where the sets S4 and S3, then the sets S4 and S2, and then the sets S4 and S1 are simultaneously off-hook.

Figure 2:
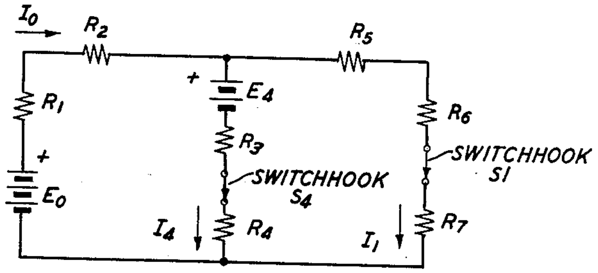
FIG. 2 is an equivalent circuit, which may be used to compute the bucking voltages needed for a substantially equal distribution of common battery current to the various telephone sets of FIG. 1.
Figure 3:
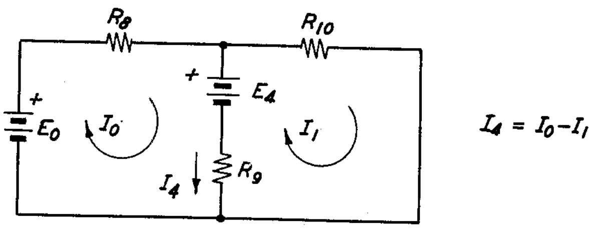
FIG. 3 is a more simplified rendition of the equivalent circuit of FIG. 2.

We can illustrate this method of computation with the assistance of FIGS. 2 and 3. We shall consider the last-mentioned computation, viz., the case where the sets S4 and S1 are simultaneously off-hook. FIGS. 2 and 3 illustrate this case. In FIG. 2:

$R1$=the resistance encountered in the central office 10,
$R2$=the resistance of the loop L6,
$R3$=the resistance of the loop L4,
$R4$=the resistance of the set S4,
$R5$=the resistance of the common line $L_{41}$,
$R6$=the resistance of the loop L1,
$R7$=the resistance of the set S1,
$E_0$=the voltage of the common battery $E_0$, and
$E_4$=the bucking voltage desired for the loop L4.

FIG. 2 can be simplified by combining resistance values. Thus, in FIG. 3, $$R8=R1+R2$$
$$R9=R3+R4, \text{ and}$$
$$R10=R5+R6+R7$$

Now to compute the value of $E_4$ for the case where the telephone sets S4 and S1 are simultaneously off-hook, we would want to make the current $I_1$ equal to one-half the current $I_0$.

Accordingly, with the aid of mesh equations based on Kirchhoff's laws, we find that $$E_4=E_0\frac{(R10-R9)}{2R8+R10} \qquad \text{(Equation 1)}$$

If, to illustrate our solution in a numerical computation, we now assume that $E_0$=50 volts
R8=1600 ohms
R9=200 ohms, and
R10=500 ohms Equation 1 yields a value of $E_4$ equal to approximately four volts. With a voltage of four volts opposing the common battery $E_0$, we find that $I_0$ equals 27 milliamperes, $I_1$ equals 13.4 milliamperes and $I_4$ equals 13.6 milliamperes. The opposing voltage $E_4$ therefore effects a virtual equalization of common battery current in the subscriber loops Ll and L4. It should be noted that without the insertion of $E_4$ in the loop L4, the currents $I_0$, $I_1$ and $I_4$ would equal 28.6, 8.2 and 20.4 milliamperes, respectively.

The other possible off-hook combinations can also be solved in the manner described. We would want to use a more general equation for these computations.

$$E_X=E_0\frac{(R10-R9)}{2R8+R10}+E_Y\frac{(2R8+R9)}{2R8+R10} \qquad \text{(Equation 2)}$$

where $E_X$ equals the bucking voltage desired and $E_Y$ equals the opposing voltage in the other loop. In our illustrative computation of $E_4$, for example, $E_X$ would have been $E_4$ and $E_Y$ would have been zero, since no bucking voltage is required in the loop L1, the loop whose telephone set is most remote from the central office 10.

While the specific and simple embodiment of the invention has been shown and described, it should not be construed as circumscribing the scope of the invention.

What is claimed is:

1. In a party-line telephone system, a central office including a common battery; a plurality of subscriber loops having direct-current resistances; a main transmission line having direct-current resistance; a telephone set terminating each of said subscriber loops, each of said subscriber loops being connected across said main line; said main line being connected to said central office and including said common battery; and a plurality of sources having electrolytes for producing direct-current voltage outputs, said sources being connected in said subscriber loops between said terminating sets and said main line and oriented to oppose the flow of current from said common battery, said sources having voltage outputs which are inversely related to the respective sums of said direct-current resistances of said connected subscriber loops and the portions of said direct-current resistance of said main line between said common battery and said connected subscriber loops.

2. In a party-line telephone system, a central office including a common battery; a plurality of subscriber loops having direct-current resistances; a main transmission line having direct-current resistance; a telephone set terminating each of said subscriber loops, each of said subscriber loops being connected across said main line; said main line being connected to said central office and including said common battery; and a plurality of electrolytic sources of bucking direct-current potentials connected serially in said loops to oppose the flow of current from said common battery, said potentials being inversely related to the respective sums of said direct-current resistances of said connected subscriber loops and the portions of said direct-current resistance of said main line between said common battery and said connected subscriber loops, one of said potentials being zero for the greatest one of said sums.

3. A party-line telephone system according to claim 2 wherein said electrolytic sources have negligible alternating-current impedances.

References Cited by the Examiner

UNITED STATES PATENTS 2,924,667 2/60 Hochgraf ---------------- 179—35

ROBERT H. ROSE, *Primary Examiner.*

WILLIAM C. COOPER, *Examiner.*